United States Patent [19]

Erath et al.

[11] Patent Number: 5,702,212
[45] Date of Patent: Dec. 30, 1997

[54] DRILLING DEVICE FOR PRODUCING DRILLED HOLES WITH AN UNDERCUT

[76] Inventors: Herbert Erath, Kesselweg 11, D-72178 Waldachtal; Armin Blaese, Krokusstr. 12, D-72160 Horb-Altheim, both of Germany

[21] Appl. No.: 632,963

[22] Filed: Apr. 16, 1996

[30] Foreign Application Priority Data

Apr. 19, 1995 [DE] Germany ............... 195 14 379.5

[51] Int. Cl.⁶ ............................................. B23B 41/00
[52] U.S. Cl. ............................... 408/153; 468/159; 468/180; 468/236; 82/1.5
[58] Field of Search ........................ 408/236, 153, 408/159, 180; 409/143; 82/1.5

[56] References Cited

U.S. PATENT DOCUMENTS

| | | | |
|---|---|---|---|
| 4,195,957 | 4/1980 | Wittkopp et al. | 408/180 X |
| 4,487,275 | 12/1984 | Froehlich | 82/1.5 X |
| 4,613,262 | 9/1986 | Woods | 408/236 X |
| 5,226,763 | 7/1993 | Lind | 409/143 X |
| 5,462,393 | 10/1995 | Eischeid | 408/180 X |
| 5,544,989 | 8/1996 | Erath | 408/236 X |

FOREIGN PATENT DOCUMENTS

| | | |
|---|---|---|
| 3106612 | 9/1982 | Germany . |
| 3122422 | 1/1983 | Germany . |
| 4330058 | 3/1995 | Germany . |
| 19514379.5 | 4/1995 | Germany . |

*Primary Examiner*—Daniel W. Howell
*Assistant Examiner*—Henry W. H. Tsai

[57] ABSTRACT

In a drilling device for producing drilled holes with an undercut, in particular in facing panels of stone, ceramics, concrete or similar materials a drive motor of a drilling shaft is mounted so as to swivel, is displaced outward by a sloping surface, and is driven by a lead screw gear unit to perform a precession movement.

7 Claims, 2 Drawing Sheets

5,702,212

DRILLING DEVICE FOR PRODUCING DRILLED HOLES WITH AN UNDERCUT

BACKGROUND OF THE INVENTION

The invention relates to a drilling device for producing drilled holes with an undercut.

Drilled holes with an undercut in facing panels or similar structures are required for the panels to be fixed by expansible plugs. The undercuts have to be made very exactly, so that when inserting and expanding an expansible plug the expansion pressure that is generated is not too great. Too great an expansion pressure could result in a part of the facing panel braking away.

Known drilling devices have a drive means, which provides a rotational drive to the drilling tool to produce a cutting movement, a forward feed device, which moves a drilling tool into a facing panel or similar, that is, into a workpiece, and an outward displacement device with which the drilling tool for producing the undercut is displaced outward radially once the drilled hole has been drilled cylindrically to its full depth or at least to part of its depth. DE 43 40 058 A1 discloses such a drilling device, which enables a drilled hole with an exactly made undercut to be produced by automatic machine-controlled swivelling of a drilling tool relative to an axis of rotation. To that end, a drill holder, which is held in a hollow rotationally driven drilling shaft, is swivelled though a small angle in relation to the axis of rotation, once the cylindrical part of the drilled hole has been drilled. In this manner the drill holder, together with a drilling tool chucked therein, performs a precession movement that is, the axis of drill holder and drilling tool circles on a cone-shaped envelope. The circumferential speed of the precession movement corresponds to the rotational speed of the drilling shaft.

With the known drilling device, it is important that a cutting edge of the drilling tool projects outward in a radial direction during the precession movement, that is, it must point outward from the precession cone described by the drilling tool. This is necessary in order to ensure that material in the facing panel or similar structure is abraded by the cutting edge of the drilling tool. A drilling tool cutting edge that does not project outward would not come into contact with the material of the facing panel or similar structure when the drilling tool is swivelled with the drill holder. An angled orientation of the drilling tool in relation to the swivelling direction of the drill holder in the drilling shank is therefore required. Moreover, when making the undercut only one cutting edge of the drilling tool is used and becomes worn.

SUMMARY OF THE INVENTION

It is therefore an object of the present invention to provide a drilling device for producing drilled holes with an undercut, which avoids the disadvantages of the prior art.

More particularly, it is an object of the present invention to provide a drilling device to produce drilled holes with an undercut, in which the rotational movement of a drilling tool is independent of the precession movement thereof to produce the undercut.

In keeping with these objects and with others which will become apparent hereinafter, one feature of the present invention resides, briefly stated, in a drilling device for producing drilled holes with an undercut in which an outward displacement device has a swivel unit and a lead screw gear unit with a course thread pitch, the swivel unit has a flexing-resistant connection to a chuck for a drilling tool and close to the chuck is mounted so as to swivel about a pivot point, in that a lead screw or a lead screw nut of the lead screw gear unit is displaceable in direction of a longitudinal center line of the drilling device and upon a forward feed displacement the swivel unit is swivelled from its central position by the outward displacement mechanism, the lead screw nut or the lead screw which is caused to rotate by the displacement of the lead screw or the lead screw nut is joined to the swivel unit so that they rotate together, and the displacement after the full outward displacement has been reached amounts to at least one thread pitch.

In the drilling device according to the invention, the outward displacement device does not co-rotate with the drilling tool, but performs a precession movement at its own, preferably substantially slower, circumferential speed. In so doing, at least one complete rotation with fully outwardly displaced drilling tool is effected. This has the advantage that the cutting speed can be selected independently of the precession speed. Furthermore, during production of the undercut all the cutting edges of the drilling tool are used to abrade material, so that the cutting edges are uniformly worn down. The use of all cutting edges additionally allows greater cutting efficiency.

Furthermore, the invention device enables a swivel axis for outward displacement of the drilling tool to be positioned close to a workpiece to be machined. In this manner the tip of the precession cone that is described by the outwardly displaced drilling tool as the undercut is being made is located close to a surface of the workpiece. This has the advantage that the cylindrical part of the drilled hole is not widened, or is only slightly widened, as the undercut is being made.

The inventive device has a swivel unit which, to make the undercut, is displaced outward from its central position once the cylindrical part of the drilled hole has been drilled to its full depth or at least to part of its depth. The outward displacement is a swivelling movement about a small angle in relation to a longitudinal center line of the drilling device.

In addition to the outward displacement, the swivel unit is rotated about the longitudinal center line of the drilling device, to be precise through at least one full rotation, once full outward displacement has been reached in order to make the undercut. By rotation of the outwardly displaced swivel unit, the drilling tool described a precession movement. The displacement movement that serves for the outward displacement is also used for the rotation: by a lead screw gear unit the displacement is converted into a rotation. For that purpose either a lead screw or a lead screw nut of the lead screw gear unit can be displaced and consequently the respective other part, that is, the lead screw nut or the lead screw, is rotated. The rotating part of the lead screw gear unit is connected to the swivel unit so that they rotate together. In this manner a displacement movement is converted into a swivelling and a rotating movement, so that to produce the undercut exclusively a straight-line drive movement is necessary.

In one embodiment of the inventive device, the outward displacement is effected by a cam face of an displacement block, which is displaced in the forward feed direction of the drilling device and in so doing displaces the swivel unit from its central position. A seat for the drilling tool has a flexing-resistant connection to the swivel unit, that is, the tool performs the swivelling movement jointly with the swivel unit.

In another embodiment of the inventive device, the outward displacement and the precession movement are initiated by a depth stop which rests on the workpiece when a set drilling depth has been reached. This is possible by a control mechanism, for example, which discontinues the forward feed when the depth stop makes contact and sets the outward displacement device in operation.

In a further development of the inventive device, when the depth stop comes into contact with the workpiece it unlocks a dog, which locks the outward displacement device to a parallel support that performs the forward feed movement. By releasing the dog, the outward displacement device and the parallel support are separated from one another. The pushing movement produced by the forward feed device is, as described above, converted into an outward displacement and rotary movement of the swivelling device. No further forward feed takes place after the depth stop has made contact. The swivelling device with the depth stop is held in engagement with the workpiece by a spring bearing against the parallel support.

In order to minimize friction, the lead screw gear unit is preferably constructed as a recirculating ball gear unit in which balls which are able to roll in helical grooves of the threaded lead screw produce the positive engagement with the threaded nut. Restoring balls emerging from the lead screw nut to other ends of the lead screw nut is effected by a ball bearing guide tube, so that the balls move in an endless circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
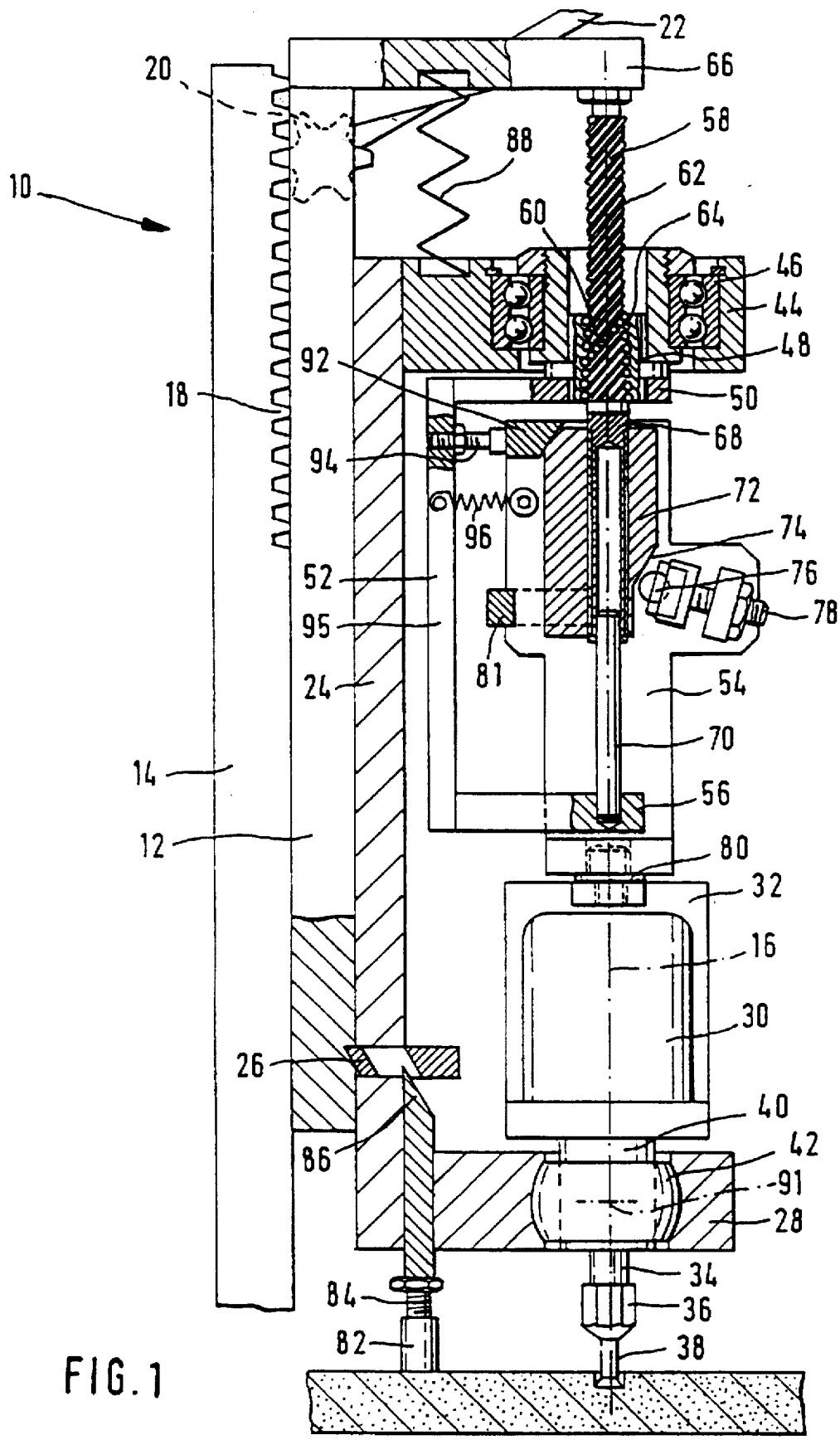
FIG. 1 shows, in its normal position, a drilling device according to the invention.

The drilling device according to the invention illustrated in FIG. 1 and denoted generally by the reference numeral 10, has a parallel support 12 which is held on a column 14 by a dovetail guide mechanism, a rod guide mechanism or similar means so as to be displaceable along a longitudinal center line 16. The column 14 is provided for a portion of its length with a toothing 18. A gearwheel 20 that is rotatably mounted on the parallel support 12 meshes with this toothing 18. A hand lever 22 is connected to the gearwheel 20 so that they turn together. Operation of this hand lever 22 effects the forward feed of the drilling device 10 according to the invention, and also the return movement thereof into its starting position, in the direction of the longitudinal center line 16. In this manner a cylindrical bore can be made in a work-piece, for example, in a facing panel or similar structure.

A slider 24 is mounted on the parallel support 12 by a dovetail guide mechanism, (not visible) so as to be displaceable parallel to the displacement direction of the parallel support 12 on the column 14. A dog 26 of the slide 24 engages in the parallel support 12 so that the slide 24 moves together with the parallel support 12.

An electric motor 30 is mounted by a motor carrier 32 on a short crossbeam 28 at the leading end of the slide 24, viewed in the forward feed direction. The electric motor 30 provides the rotational drive to a drilling shaft 34 which projects through the crossbeam 28 of the slide 24. The drilling shaft 34 has a chuck 36 in which a drilling tool 38 is chucked. Rotation of the drilling shaft 34 effects the cutting movement of the drilling tool 38. The electric motor 30 is mounted on the crossbeam 28 so that it does not rotate about the longitudinal center line 16.

The electric motor 30 is mounted by a ball-and-socket joint on the crossbeam 28 so as to pivot relative to the longitudinal center line 16 of the drilling device 10. A ring 42 having a spherical outer surface which is inserted in a bore in the crossbeam 28 of complementary shape, is mounted on a flange 40 of the electric motor 30.

At the second end of the slide 24 remote from the drilling tool 38 there is mounted a second crossbeam 44, in which a lead screw gear unit is inserted. A lead screw nut 48 is mounted by a double-row angular ball bearing 46 rotatably in the second crossbeam 44. The axis of the lead screw nut 48 coincides with the longitudinal center line 16 of the drilling device 10 according to the invention. The lead screw nut 48 is inserted non-rotatably in one arm 50 of a bracket 52, which engages laterally around a swivel plate 54. The swivel plate 54 lies laterally on a second arm 56 of the bracket 52 so that the swivel plate 54 is connected to the bracket 52, and is connected by the bracket 52 to the lead screw nut 48 so that they rotate together.

Running through the lead screw nut 48 is a threaded lead screw 58, which is also a component part of the lead screw gear unit. The lead screw gear unit is in the form of a recirculating ball gear unit with balls 60 providing a positive engagement between the lead screw 58 and the lead screw nut 48. The balls 60 circulate in grooves 62, 64 in the threaded lead screw 58 and the lead screw nut 48 which are in the form of an extra-coarse pitch thread. A ball bearing guide tube, not visible in the drawing, provides the return of balls 60 emerging at one end from the lead screw nut 48 to the other end of the lead screw nut 48, so that the balls 60 circulate in a closed loop.

The lead screw 58 is screwed to a cross-arm 66 of the parallel support 1 which is located beyond the second crossbeam 44 of the slide 24, and cannot therefore be twisted.

The lead screw 58 continues right through the lead screw nut 48 and becomes an integral hollow cylinder portion 68. This hollow cylinder portion 68 is guided on a pin 70 which is inserted in the second arm 56 of the bracket 52 remote from the lead screw nut 48 and close to the electric motor 30. A displacement block 72 is held on the cylinder portion 68 so as to rotate but so that it cannot be displaced in the axial direction relative to the lead screw 58. The lead screw 58, the bracket 52, the guide pin 70 and the displacement block 72 always remain axially aligned with respect to the longitudinal center line of the drilling device 10 according to the invention.

The displacement block 72 has an inclined surface providing the cam face 74. The distance of the cam face from the longitudinal center line 16 of the drilling device 10 increases in the direction towards the led screw nut 48. The cam face 74 is provided for engagement by a cup-mounted roller 76 which is mounted on the swivel plate 54. The cup-mounted roller 76 has a threaded bolt 78 with which its radial spacing from the cam face 74 can be adjusted.

The swivel plate 54 has a flexing-resistant connection to the motor seat 32 by a rotation-permitting coupling 80. On outward displacement of the swivel plate 54 in a radial direction the swivel plate is swivelled together with the electric motor 30 about the ball-and-socket joint 42. Rotary movement of the swivel plate 54 about a center line of the electric motor 30, which in the starting position of the drilling device 10 according to the invention illustrated in FIG. 1 coincides with the longitudinal center line 16, is possible by the rotation-permitting coupling 80.

Besides the guide pin 70 of the bracket 52, the swivel plate 54 has a forked counter support 82 which engages around the side of the displacement block 72 and accordingly fixes the displacement block 72 to the swivel plate 54 in the lateral direction transverse to an outward displacement direction.

The drilling device 10 according to the invention functions as follows: after switching on the electric motor 30, the hand lever 22 is pressed down, effecting a forward feed movement of the parallel support 12. The slide 24 locked to the parallel support 12 by way of the locking bar 26 moves together with the parallel support 12. As a result the drilling tool 38 also performs the forward feed movement of the parallel support 12 in the direction of the longitudinal center line 16 of the drilling device according to the invention. In this manner a cylindrical drilled hole is produced.

When a certain, adjustable, depth of the drilled hole has been reached, a depth stop 82 makes contact with a workpiece, not shown, for example, a facing panel or similar structure. To adjust the depth of the drilled hole, the depth stop 82 is provided with a thread 84. The depth stop 82 positioned against the workpiece moves relative to the parallel support 12 and slide 24 which continue to move. In so doing, a sloping decoupler face 86 draws the locking bar 26 out of engagement with the parallel support 12. The slide 24, which bears against the workpiece by way of the depth stop 82, remains during the continued movement of the parallel support 12 at the distance from the workpiece set by the depth stop 82. A helical compression spring 88 bearing against the cross-arm 66 of the parallel support holds the slide 24 at this distance from the workpiece. The drilling tool 38 moves no further in the axial direction.

Figure 2:
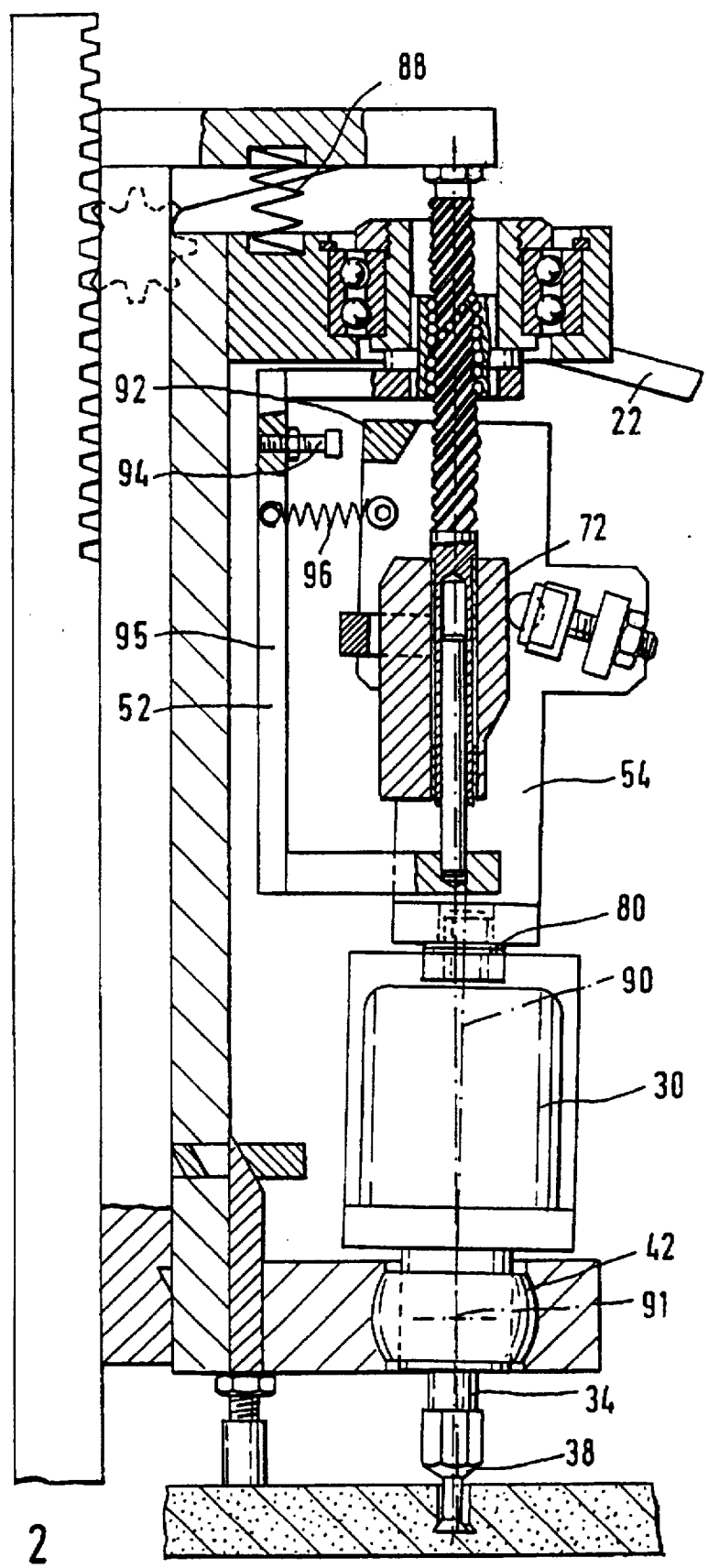
FIG. 2 shows the drilling device of FIG. 1 with the swivel unit displaced outward.

Through the continued movement of the parallel support 12 in the forward feed direction, the lead screw 58 attached to it is moved towards the in the direction of the longitudinal center line 16 of the drilling device 10 according to the invention. The displacement block 72 is displaced together with the lead screw 58, the cup-mounted roller 76 comes into engagement with the cam face 74 of the displacement block and is pushed radially away from the longitudinal center line 16. The swivel plate 54 is likewise pushed away from the longitudinal center line 16 by the cup-mounted roller 76. The swivel plate 54, together with the electric motor 30, to the carrier 32 of which it has a flexing resistant connection, consequently performs a swivel movement about the ball-and-socket joint 42, the drilling tool 38 displaced outward through a swivel angle relative to the longitudinal center line 16 (FIG. 2). The magnitude of the swivel angle is set by the threaded bolt 78 of the cup-mounted roller 76.

Through displacement of the lead screw 58, the led screw nut 48 and with it the bracket 52 and the swivel plate 54 are caused to rotate (in FIG. 2, the bracket 52 and the swivel plate 54 have been left unrotated for the sake of clarity). Through this rotation superimposed on the outward displacement, the swivel plate 54, together with the electric motor 30 and the drilling tool 38 chucked in the drilling shaft 34, performs a precession movement. The center line 90 of the electric motor 30 (FIG. 1), which is simultaneously the axis of rotation of the drilling tool 38, moves on a cone of precession, the tip of which coincides with the pivot point 91 of the ball-and-socket joint 42. The displacement travel of the lead screw 58 in the lead screw nut 48 is of such a length that a complete precession revolution takes place once the drilling tool 38 has been fully outwardly displaced. In this manner an undercut is made in the bore.

Since the electric motor 30 is independent of the rotation of the swivel plate 54 by way of the rotation-permitting coupling 80, it does not turn with it. The cutting speed of the drilling tool 38 is determined essentially by the speed of rotation thereof and its diameter, the precession movement proceeds considerably more slowly.

The return movement of the drilling device 10 according to the invention to its starting position illustrated in FIG. 1 is effected in reverse order, the spring 88 first effecting restoration of the outwardly displaced parts 54, 30, 34, 38 to their central position. A wedge 92 mounted on the swivel plate 54 determines the starting position of the displacement block 72. The central position of the swivel plate 54 is adjustable by an adjusting screw 94, which is screwed into a yoke 95 of the bracket 52. A helical tension spring 96 acting on the yoke 95 and on the swivel plate 54 draws the swivel plate 54 from its outwardly displaced position back into its central position.

It will be understood that each of the elements described above, or two or more together, may also find a useful application in other types of constructions differing from the types described above.

While the invention has been illustrated and described as embodied in a drilling device for producing drilled holes with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drilling device for producing drilled holes with an undercut, comprising feed means for providing a feed movement of the device; drive means for driving a drilling tool; an outward displacement means for outwardly displacing the drilling tool, said outward displacement means for laterally outwardly displacing the drilling tool and including a swivel unit and a lead screw gear unit having a coarse thread pitch and including a lead screw and a lead screw nut which form two screw elements, said swivel unit having a flexing-resistant connection to a chuck for the drilling tool and being mounted so as to swivel about a pivot point, one of said screw elements of said lead screw gear unit being displaceable in direction of a longitudinal center line and upon a forward feed displacement said swivel unit being swiveled from its central position by said outward displacement means, so that said one of said screw elements is caused to rotate by the displacement of the other of said screw elements and is joined to said swivel unit so that they rotate together, and the displacement after the full outward displacement has been reached amounts to at least one thread pitch.

2. A drilling device as defined in claim 1, wherein said lead screw has an extension, said outward displacement means including a displacement block which has a cam face and is mounted on said extension of said lead screw so that it cannot be displaced in an axial direction relative to said lead screw, said swivel unit including a displacing element which during the displacement of said lead screw acts on said cam face and displaces said swivel unit outward.

3. A drilling device as defined in claim 1; and further comprising a depth stop which initiates the outward displacement movement of said displacement means when it comes into contact with a workpiece to be drilled.

4. A drilling device as defined in claim 3; and further comprising a support movable in a forward feed direction, said feed means acting on said support, said outward displacement means being slidably guided on said support in the forward feed direction, said at least one of said lead screw elements being connected to said support; a releasable dog locking said outward displacement means to said support, said depth stop when it comes into contact with the workpiece for drilling decoupling said dog; and a spring element bearing against said support and holding said outward displacement means in engagement with the workpiece for drilling.

5. A drilling device as defined in claim 1, wherein said drill unit has a swivel bearing including a ball-and-socket joint.

6. A drilling device as defined in claim 5, wherein said ball-and-socket joint has a ring with a spherical outer surface.

7. A drilling device as defined in claim 1, wherein said lead screw gear unit has a recirculating ball gear unit.

* * * * *